United States Patent [19]

Brister

[11] 4,441,328

[45] Apr. 10, 1984

[54] METHOD AND APPARATUS FOR FORMING A TEMPORARY PLUG IN A SUBMARINE CONDUIT

[75] Inventor: Beryle D. Brister, Amarillo, Tex.

[73] Assignee: Brister, Incorporated, Amarillo, Tex.

[21] Appl. No.: 328,028

[22] Filed: Dec. 8, 1981

[51] Int. Cl.³ .................... F25D 3/00; D03D 49/00
[52] U.S. Cl. .................................. 62/53; 62/293;
73/40.5 R; 138/97
[58] Field of Search .............. 62/53, 260, 293, 62;
73/40.5 R; 138/97; 405/158

[56] References Cited

U.S. PATENT DOCUMENTS

| | | | |
|---|---|---|---|
| 3,926,006 | 12/1975 | Brooks et al. | 62/293 X |
| 4,112,706 | 9/1978 | Brister | 62/293 X |
| 4,355,925 | 10/1982 | Rognoni | 405/158 X |

Primary Examiner—William E. Wayner
Attorney, Agent, or Firm—Hubbard, Thurman, Turner & Tucker

[57] ABSTRACT

Fluid transmission lines in a submarine or hazardous environment are provided with substantially fluid tight seals by the formation of a temporary ice plug within the interior of the line using a housing forming a cryogenic fluid circulation chamber installed around the exterior of the line. Remote controlled valves are interposed in separate conduits for supplying fluid to chambers formed within the housing, venting fluid vapor from the chambers, recirculating liquid cryogenic fluid back to a reservoir and for purging sea water from the chambers formed by the housing. The remote controlled valves are preferably controlled from a service vessel on the water surface or from within a submarine habitat. Conduit assemblies are provided with self closing quick disconnect connector assemblies whereby the service vessel containing a source of cryogenic fluid and a control station may abandon the work site during heavy sea conditions. The operating sequence for installation and freezing of the temporary plug includes installation of the housing forming the fluid circulation chamber by skilled divers followed by purging of sea water from within the chamber using compressed air or cryogenic fluid in gaseous form. Cryogenic fluid pressure within the chamber formed by the housing is preferably maintained at a pressure slightly greater than the hydrostatic sea water pressure at the location of the housing on the transmission line so as to minimize stress on the housing structure and to minimize the chance of leakage of sea water into the housing chambers.

24 Claims, 6 Drawing Figures

METHOD AND APPARATUS FOR FORMING A TEMPORARY PLUG IN A SUBMARINE CONDUIT

BACKGROUND OF THE INVENTION

1. Field of the Invention

The present invention pertains to methods and apparatus for forming a temporary fluid tight plug in a conduit such as a fluid transmission pipeline disposed in a submarine environment wherein a liquid slug or isolating pig is frozen within the line by the circulation of a cryogenic fluid through a housing which is temporarily placed on the line. Alternatively, the fluid circulation housing may be disposed in a habitat adapted for circulation of the cryogenic fluid and control of the freezing process.

2. Background Art

The present invention pertains to an improved method and apparatus for providing temporary plugs in closed generally cylindrical conduits and particularly in relatively large diameter fluid transmission lines for purposes of installation, repair, modification and hydrostatic testing thereof. The formation of a temporary substantially fluid tight seal or plug in a fluid transmission pipeline by freezing a slug of liquid within the interior of the pipe is a viable process. One successful method is disclosed in U.S. Pat. No. 3,827,282 issued Aug. 6, 1974 to B. D. Brister. Improved apparatus for carrying out various processes in forming a plug of frozen liquid in a section of a pipeline or the like is disclosed also in U.S. Pat. Nos. 4,112,706 and 4,220,012 also issued to B. D. Brister.

The aforementioned patents contemplate the formation of a frozen slug of liquid which may be provided using the liquid in the pipeline itself or by injecting a quantity of water or other freezable liquid into the line between, for example, spaced apart batch pigs. The slug of liquid is transported to the desired freezing location and a housing is placed around the exterior of the pipeline, which housing is adapted for the circulation of a cryogenic fluid to freeze the liquid within the line at the desired site.

The substantial number of fluid transmission lines submerged in various bodies of fresh and sea water have presented new problems in carrying out installation, repair, modification and testing of these lines. Moreover, the transportation of highly volatile fluids through pipelines in various environments also presents, in many instances, hazardous working conditions for personnel attempting to carry out the desired procedures. In both instances it has become highly desirable to provide for the remote control of the process of forming the fluid tight seal or plug.

The modification and repair of fluid transmission lines disposed in submarine environments has been a particular problem due to the inaccessibility of the line to the equipment needed for circulating the cryogenic fluid around the exterior of the line to thereby freeze the liquid slug within the line or, alternatively, a quantity of liquid disposed within a closed container of one type or another deployed within the line. Although certain techniques and equipment have been developed for providing subsea enclosures or habitats whereby workers may have access to a section of a fluid transmission line without working in diving gear, prior art techniques for forming a plug in a section of line within the enclosure or habitat have not been entirely successful and have been somewhat dangerous.

However, in accordance with the present invention improved methods and apparatus have been developed for carrying out various operations on fluid transmission lines located in submarine environments as well as in areas wherein it is desirable to have operating personnel located remote from the location of the plug or seal for as much of the operating time as possible. Some of the latter mentioned environments considered are any areas where highly volatile or otherwise dangerous fluids are being conducted through a pipeline including offshore petroleum producing platforms as well as fluid transmission lines located in hazardous environments such as areas where toxic substances are being produced or are likely to be vented, including nuclear processing or power plants.

SUMMARY OF THE INVENTION

The present invention provides for improved methods and apparatus for providing temporary plugs in relatively large diameter fluid transmission lines utilizing the concept of freezing a quantity of liquid to form a plug element having substantial structural strength and being forcibly engaged with the inner wall of the transmission line to withstand relatively high working pressures within the line and to form a substantially fluid tight seal. In particular, the present invention contemplates improved methods and apparatus for forming a plug of a frozen liquid which has been injected directly into the line or is disposed within a substantially closed container which has been inserted into the line. More particularly, the present invention is directed to improved methods and apparatus for forming a temporary plug in a fluid transmission line wherein the process of forming the plug and the monitoring of the plug after formation is carried out by remote control of the plug forming apparatus.

In accordance with one aspect of the present invention there is provided improved methods and apparatus for forming temporary plugs in fluid transmission lines disposed in submarine environments of varying depths. For repair or modification of fluid transmission lines located in relatively shallow bodies of water at depths of, for example, less than approximately 100 feet the present invention contemplates the provision of a housing adapted to form a closed chamber around the exterior of a pipeline, which housing may be carried to the site of formation of the temporary plug by submarine divers and installed on the line. The housing is provided with fluid conduits in which are disposed remotely operated valves, which conduits are also provided with quick disconnect self-sealing couplings for connection to conduits of considerable length which lead to a surface installation including a storage tank and circulating pumps for the cryogenic fluid. Further in accordance with a preferred embodiment of the present invention the control valves located in proximity to the housing disposed around the transmission line are adapted to be remotely controlled from a monitoring and control station located at the surface of the body of water on a barge or service vessel.

Accordingly, upon installation of the housing for circulating the cryogenic fluid all operations for forming the temporary plug or plugs in the fluid transmission line may be carried out from the relative safety and convenience of a service ship or vessel which may be maintained on station as long as weather conditions are favorable for conducting operations.

The present invention also provides improved methods and apparatus for forming a frozen plug or seal in a fluid transmission line disposed in a submarine environment wherein various steps must be carried out and monitored from the surface including the purging of water from the interior of the fluid circulating housing, monitoring of the circulation of the cryogenic fluid, monitoring of the temperature of the exterior of the pipeline to maintain a frozen plug and monitoring of the pressure in the housing chamber to maintain a pressure sufficient to prevent incursion of sea water or undue stress from water pressure exerted on the housing.

In accordance with yet another aspect of the present invention there is provided an improved method and apparatus for forming a frozen plug or seal in a fluid transmission line at relatively great submarine depths wherein a habitat is installed around the transmission line and the cryogenic fluid circulating housings are placed on the line within the habitat to be controlled and monitored in a portion of the habitat sealed from the chamber in which the housings are located or from a station or vessel on the surface.

Those skilled in the art will appreciate that the present invention serves a long felt need in the art of modification, repair, and testing of fluid transmission pipelines and the like located in submarine environments as well as hazardous surface environments and other conditions where remote control of the formation and monitoring of a temporary plug or seal in the line is necessary or desirable. Although the invention is particularly suitable for use in connection with submarine pipelines, the method and apparatus can be used for virtually any submerged or relatively inaccessible conduit including conduits disposed in hazardous environments. Other advantages and superior features of the present invention will also be appreciated and realized by those skilled in the art upon reading the detailed description which follows.

DETAILED DESCRIPTION OF THE PREFERRED EMBODIMENTS

Figure 1:
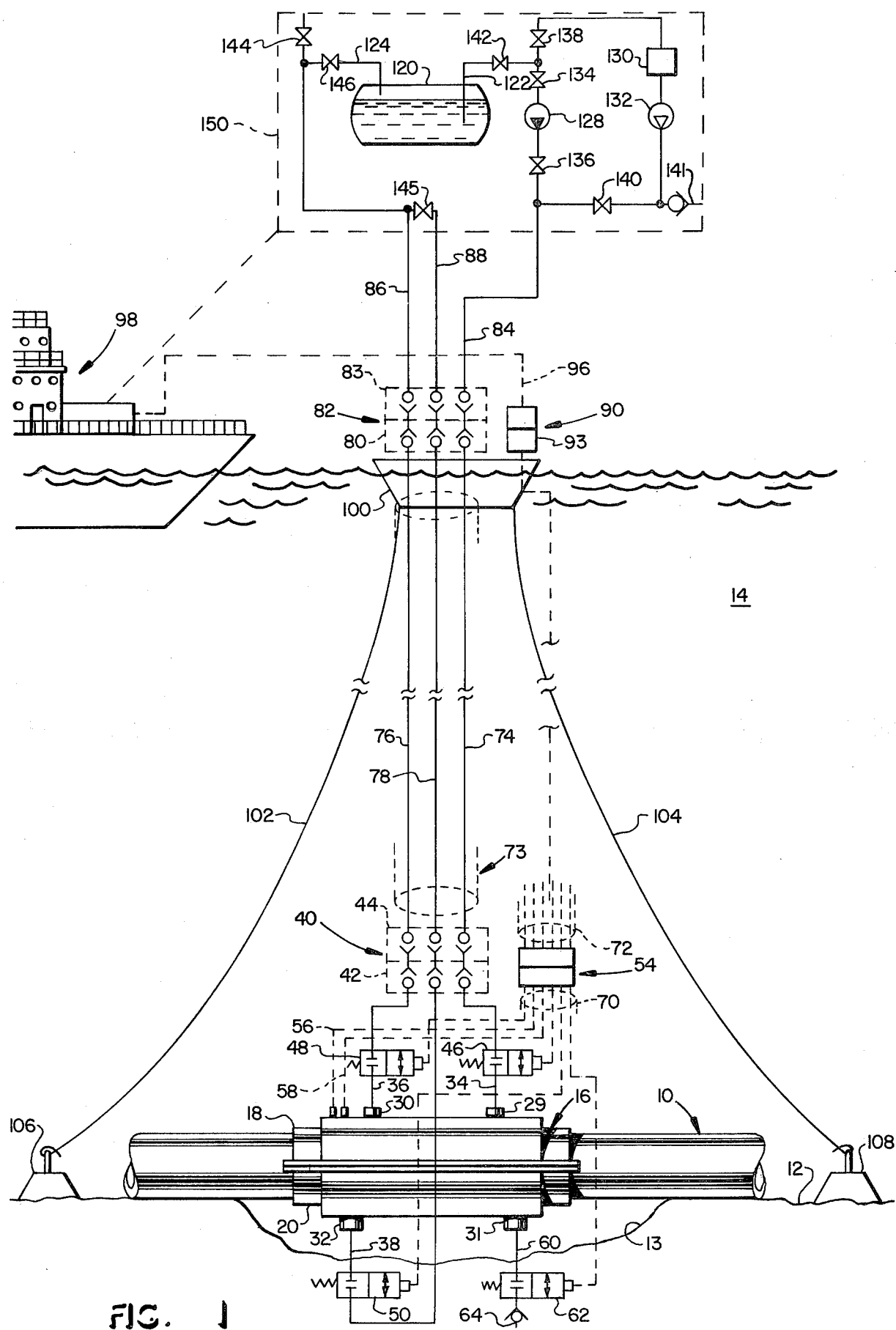
FIG. 1 is a schematic illustration of a submarine fluid transmission line installation including the improved apparatus for forming a temporary plug in the line in accordance with the present invention.

In the description which follows like parts are marked throughout the specification and drawings with the same reference numerals, respectively.

Referring to FIG. 1 of the drawings, there is illustrated somewhat schematically an arrangement for providing a temporary plug of frozen liquid in a submarine conduit such as a fluid transmission pipeline. In FIG. 1 a section of a generally cylindrical fluid transmission pipeline is illustrated and generally designated by the numeral 10. The pipeline 10 is shown disposed on the floor 12 of a body of water 14 which, for purposes of this description, may be either an ocean, lake or river.

The formation of a temporary plug or plugs spaced apart one from the other in the pipeline 10 may be necessary for various purposes including installation of a new section of line, repair of a damaged section of line, modification of a line to either provide a branch conduit or a control device such as a valve, or lastly provide for testing of the line for one purpose or another. Those skilled in the art will appreciate that there may be other instances wherein it is desirable or necessary to form one or more spaced apart plugs in a fluid transmission line of one size or another.

The aforementioned patents disclose generally the technique for forming a frozen slug of liquid in a transmission line such as the pipeline 10 by transporting through the line a slug of liquid which may be relatively easily frozen. This slug of liquid could be the line product itself or a slug of relatively easily frozen liquid such as water injected into the line between two batch pigs, for example. Alternatively, pigs or other devices containing a flexible container filled with liquid could be positioned within the line at the desired site for formation of the plug. In any case it is necessary to provide means for circulating a low temperature fluid around the exterior of the pipeline 10 at the designated site for formation of the temporary plug, not shown.

Figure 3:
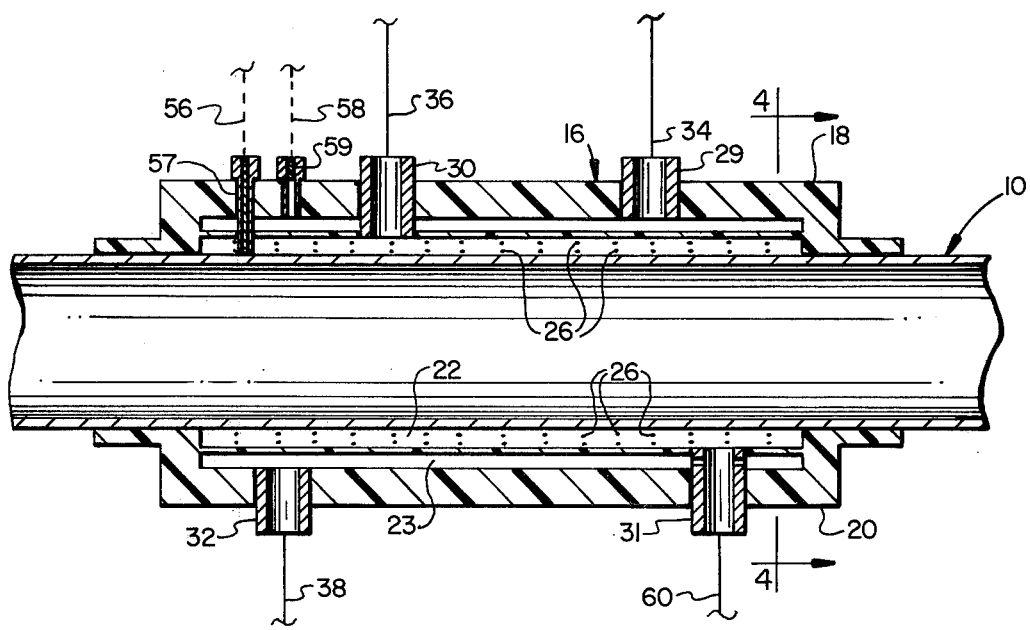
FIG. 3 is a detailed illustration, in section, of one of the cryogenic fluid circulating housings used in combination with the methods and apparatus of the present invention.
Figure 4:
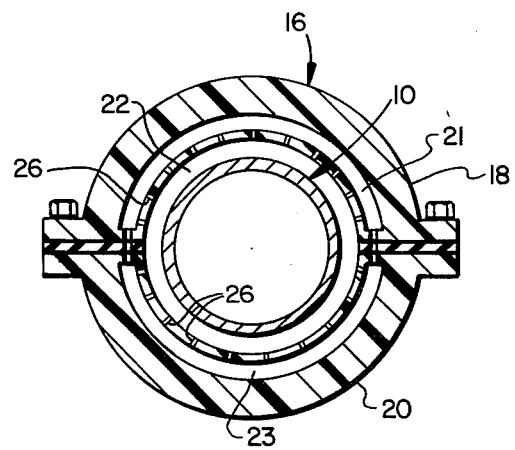
FIG. 4 is a section view taken along the line 4—4 of FIG. 3.

A highly preferred arrangement for circulating cryogenic fluid around the exterior of the line 10 to freeze the slug of liquid disposed within the line is providing a housing as illustrated in FIGS. 1, 3 and 4 and generally designated by the numeral 16. The housing 16 comprises two substantially half cylindrical shells forming an interior chamber 22, as shown in FIG. 3, when disposed around the exterior of the cylindrical pipeline 10, which chamber is adapted to be in communication with a source of cryogenic fluid which is circulated through the chamber to provide for freezing the slug of liquid within the interior of the pipeline 10. A more detailed discussion of the construction and arrangement of the housing 16 may be obtained by referring to U.S. Pat. No. 4,220,012 which is incorporated herein by reference.

According to the disclosure of the aforementioned patent the housing 16 comprises a refrigeration unit having generally cylindrical half sections 18 and 20 which are assembled around the pipeline 10 to define the annular chamber 22 for containing a refrigerant such as, for example, liquid nitrogen or other cryogenic fluid. As shown in FIGS. 3 and 4, the housing sections 18 and 20 include interconnected cylindrical manifold chambers 21 and 23 which are in communication with the chamber 22 by a plurality of fluid distribution orifices 26 for discharging refrigerant into the chamber 22 and distributing the refrigerant substantially uniformly over the enclosed exterior surface of the transmission line 10. The housing 16 could be provided with other internal fluid distribution means as discussed in the aforementioned patents.

Referring also to FIG. 1, the housing 16 is provided with a boss 29 forming an inlet passage into the manifold chambers 21 and 23 for conducting cryogenic fluid into the interior of the housing. The housing 18 also includes a boss 30 providing a passage for venting refrigerant vapor from the chamber 22, large quantities of which are formed during the exchange of heat from the liquid which is being frozen within the pipeline to the liquid refrigerant or cryogenic fluid being circulated through the chamber. The housing shell 20 is also provided with a boss 32 which forms a passage in communication with the chambers 21 and 23 through which liquid refrigerant or other fluid may be circulated, preferably, back to the reservoir containing the liquid refrigerant. The shell 20 further includes a boss 31 forming a passage in communication with the chambers 21, 22 and 23 through which fluids within the chambers, including sea water, may be purged at the beginning of the freezing process.

The bosses 29, 30 and 32 are connected, respectively, to conduits 34, 36 and 38. Conduits 34, 36 and 38 lead to a connector assembly 40, shown schematically in FIG. 1, and comprising separable members 42 and 44. The connector assembly 40 is of the multiple conduit self-sealing type which may be of a type known in the art as a quick disconnect coupling. As indicated schematically in FIG. 1, the connector assembly 40 is of a type which will provide for transmission of fluid through the respective conduits connected to each connector member when the connector assembly is coupled together but upon disconnecting the connector members 42 and 44 the respective conduits connected to each member are sealed from the exterior environment by automatically closing check valves or the like.

The conduits 34, 36 and 38 each have interposed therein remote controlled shutoff valves designated, respectively, by the numerals 46, 48 and 50. The valves 46, 48 and 50 may be of various types but in accordance with the present invention, and as illustrated in FIG. 1, are basically of a normally closed two way type which are operable to be opened when energized. The valves 46, 48 and 50 are preferably hydraulically or pneumatically actuated and are adapted for submarine service. Such valves are commercially available and in themselves form no part of the present invention. As indicated in FIG. 1, the valves 46, 48 and 50 include pilot actuators which are in communication, respectively, with pilot pressure fluid control conduits which lead to a multi-conductor connector assembly 54, which may be basically of the same type as the connector assembly 40. The connector assembly 54 is, however, also provided with signal conductors 56 and 58 which lead, respectively, to temperature and pressure sensing elements which are, respectively, in communication with the surface of the pipeline 10 and the chambers 21-23 for purposes to be described in detail later herein.

Referring further to FIG. 1, the boss 31 is in communication with a conduit 60 leading to a pilot actuated shutoff valve 62 which, like the valves 46, 48 and 50, is adapted to be remotely controlled by pilot pressure fluid or the like. As indicated in FIG. 1 the valve 62 is normally closed and is opened when energized by a pressure fluid or other suitable control signal. It will be understood that the valves 46, 48, 50 and 62 may also be electrically operated. However, considering the operating environment contemplated in accordance with the present invention pressure fluid control valves are preferable for most installations. The conduit 60 terminates in the immediate vicinity of the housing 16 and also has interposed therein a check valve 64 to prevent the inflow of sea water or the like to the interior chambers of the refrigerant housing 16.

As indicated in FIG. 1, the valve pilot control lines and signal conductors 56 and 58 may be disposed in a harness assembly indicated schematically at 70 and 72 whereby all of the pilot control lines and signal conductors may be conveniently handled during the installation and removal of the housing 16 with respect to the pipeline 10. In a similar manner the conduits 34, 36 and 38 may also be contained within a harness or boot, not shown, to provide for ease of handling. Since the valves 50 and 62 are connected to respective conduits in communication with the shell 20, which during installation and removal of the housing 16 is separated from the shell 18, it may be preferable to provide quick disconnect couplings for the conduit 38 between the valve 50 and the coupling member 42. Moreover, the pilot control lines leading to the respective valves 50 and 62 may also be provided with quick disconnect couplings between the connector assembly 54 and the respective valves so that the shell 20 can be easily handled separate from the shell 18. Alternatively, the conduits 38 and 60 could be provided with quick disconnect couplings at the respective bosses 32 and 31 so that the shell 20 can be free of any conduits or pilot control lines during the installation and removal of the housing 16 with respect to the pipeline 10.

Since the present invention contemplates the installation of the housing 16 at relatively great depth such as on the seafloor 12 it is desirable to provide a multiple conduit assembly generally designated by the numeral 73 and which includes at one end thereof the connector member 44 and at the opposite end a similar connector member 80 comprising a part of a connector assembly 82. The conduit assembly 73 includes respective conduits 74, 76 and 78 which are adapted to be in communication, respectively, with the conduits 34, 36 and 38 when the connector members 42 and 44 are coupled together. The conduits 74, 76 and 78 are adapted to be in communication with, respectively, conduits 84, 86, and 88 when the connector members 80 and 83 of the connector assembly 82 are coupled together. The conduits 74, 76 and 78 are preferably flexible hoses of a suitable type for conducting a liquid refrigerant such as liquid nitrogen therethrough. As shown in FIG. 1, the connector assembly 82 is similar to the connector assembly 40 and is provided such that each of the conduits 74, 76, 78, 84, 86 and 88 are closed at their respective connector members 80 and 83 when the connector members are decoupled from each other.

As also shown in FIG. 1, the conductor assembly 72 including the pilot control lines for the respective valves 46, 48, 50 and 62 as well as continuations of the signal conductors 56 and 58 leads to a connector assembly 90 similar to the connector assembly 54 whereby the conductor assembly 72 may be decoupled from a continuing harness 96 leading to an operating console, not shown, which may be disposed on the service vessel or ship generally designated by the numeral 98 in FIG. 1. In accordance with a preferred arrangement for the present invention the connector assemblies 82 and 90 are arranged to be disposed on a vessel, generally designated by the numeral 100, which may comprise a buoy or a small work barge disposed generally over the site for formation of the temporary plug or plugs in the pipeline 10. The buoy 100 is adapted to be anchored by suitable anchor cables 102 and 104 connected to respective anchors 106 and 108 as shown.

Referring further to FIG. 1, the improved method and apparatus for forming a temporary plug in a submarine pipeline or the like requires a source of cryogenic fluid comprising a reservoir 120. The reservoir 120 includes respective supply and return conduits 122 and 124 which are, respectively, in communication with the supply conduits 74–84 and return and vent conduits 86 and 88. The circuit including the supply conduit 122 and the conduit 84 includes a pump 128 and a secondary circuit including a heat exchanger 130 and a gas compressor 132. As shown in FIG. 1, the supply conduit 122 may be placed in circuit with the heat exchanger 130 and the compressor 132 in place of the pump 128 for supplying gas comprising cryogenic fluid vapor to the conduit 84 by closing valves 134 and 136 while opening valves 138 and 140. A backup shutoff valve 142 remains open under either operating condition wherein cryogenic fluid is being supplied to the conduit 84–74.

The fluid return conduit 124 may also be controlled to vent fluid directly to atmosphere by opening a valve 144 and closing a valve 146 or, alternatively, all fluid recirculated from the conduits 86 and/or 88 may be returned to the reservoir 120.

In a preferred arrangement according to the present invention the elements disposed within an enclosure illustrated schematically in FIG. 1 and designated by the numeral 150 are preferably disposed on board the service vessel 98 and may be controlled by an equipment operator for controlling the supply of fluid to the housing 16 to establish and maintain a plug of frozen liquid within the pipeline 10. Alternatively, the components disposed within the enclosure 150 may be placed on board the buoy or work barge 100 although such an arrangement is not particularly preferred for operations wherein sea conditions may become severe. In fact, a particularly advantageous aspect of the present invention resides in the arrangement wherein the components disposed within the enclosure 150, as indicated in FIG. 1, are preferably placed on board the service vessel 98 together with a control console for controlling the valves 46, 48, 50 and 62 and including suitable instrumentation for monitoring the pressure and temperatures within the interior of the housing 16. Accordingly, in the event of heavy sea conditions arising from a storm, for example, the service vessel 98 could withdraw to a safe area by disconnecting the connector assemblies 82 and 90 at the buoy 100 and moving off station until sea conditions permitted operations to resume.

In a preferred method of forming a temporary plug in the pipeline 10 in accordance with the present invention, after locating the area to be plugged, the vessel 98 would be brought on station and anchored and the buoy 100 would preferably, although not necessarily, be anchored over the work area for forming the temporary plug. Assuming that the buoy 100 was to be used, skilled divers would be sent below the surface to inspect the area of the pipe to be repaired or modified. The pipe might require the removal of a protective coating although this is not always necessary but does increase the rate with which the temporary plug may be formed. In operations carried out in water normally less than 100 feet deep a habitat for the housing 16 may or may not be required. Assuming that a habitat was not required, after inspection and removal of any protective coatings around the pipeline 10 and excavating of the seafloor 12 in the area 13 indicated, to facilitate disposal of the housing 16 around the line, divers would place the housing half sections 18 and 20 around the exterior of the line and fasten them together to form a fluid tight seal. Normally the valves 46, 48, 50 and 62 would be either mounted on the respective housing sections to which they are connected or carried below in a harness assembly including the conduits and control lines disposed on the housing side of the connector assemblies 40 and 54. Because of the relatively great depths the conduit assembly 73 would preferably be deployed from a reel or the like, not shown, by lowering the connector section 44 with the conduits 74, 76 and 78 connected thereto and coupling the connector section 44 to the section 42 after installation of the valves and associated conduits with the housing 16. In a similar manner, the conductor assembly 72 would be lowered so that the connector 54 could be coupled to provide control signals to the respective valves associated with the housing 16 as well as connection of the monitoring lines 56 and 58.

If the cryogenic fluid source and associated pumping equipment disposed within the enclosure 150 is mounted on the service vessel 98 as well as the operating console for the control valves, the conductor assembly 96 would be connected to the assembly 72 by way of the connector 90 and the conduits 84, 86 and 88 would be connected to the respective conduits 74, 76 and 78 by way of the quick disconnect connector assembly 82. The coupling section 80 as well as the coupling section 93 would be disposed on the buoy 100.

Once the housing 16 is installed as shown in FIG. 1 together with the cryogenic fluid conduits and the control conduits, valves 46 and 62 are opened and nitrogen gas is pumped into the interior of the housing 16 by way of the compressor 132 and conduits 87-74-34 to purge water from the interior chambers of the housing. Nitrogen gas may be obtained from the reservoir 120 by heating the liquid nitrogen in the heat exchanger 130 and then compressing the gaseous nitrogen with the compressor 132. Normally the conduits 74, 76 and 78 would be free of any sea water or the like thanks to the self closing type coupling assembly 40. However, if self closing couplings were not used the conduits 76 and 78 would be temporarily connected to the conduit 84 by suitable means, not shown, for purging of water therefrom using compressed air or compressed nitrogen gas. The check valve 64 installed on the discharge side of the valve 62 prevents sea water from reentering the interior of the housing 16 should a malfunction of the valve 62 occur in the open position thereof. During the purging process the valves 48 and 50 would be in the closed position unless it was necessary to purge the conduits 76 and 78 together with the respective associated conduits 36 and 38. If compressed air is used to purge water from the housing 16 a source, not shown, would be connected to branch conduit 141 as shown in FIG. 1.

After purging water from the interior of the housing 16 the valve 62 is remotely actuated to be closed followed promptly by shutdown of the compressor 132, closing of valves 138 and 140 and opening of valves 134, 136 and 48 whereby liquid nitrogen may be supplied from the reservoir 120 through the pump 128 and the supply conduits 84-74-34. If an open cryogenic fluid circulation system is used valve 146 would be kept in the closed condition and valve 144 would be opened to vent nitrogen vapor through valve 48 and conduit 36-76-86 and valve 144 to atmosphere. During the circulation of the cryogenic fluid such as liquid nitrogen through the interior of the housing 16 the exterior pipe surface temperature is monitored by a temperature sensor generally designated by the numeral 57 in FIG. 3.

Moreover, the pressure within the housing 16 is preferably maintained at a value slightly greater than the hydrostatic pressure of the surrounding sea water at the location of the housing. A suitable pressure sensor could be located on the housing 16 or directly adjacent thereto for monitoring the sea water pressure together with the monitoring of the pressure in the chambers 21–23 which is accomplished by a transducer 59, FIG. 3. The valve 144 could be automatically controlled to maintain a back pressure within the chamber formed by the housing 16 to maintain the desired pressure level therein.

If a closed circulatory operating mode is commenced valves 144 and 48 are closed and valves 50, 145, and 146 are opened to circulate liquid nitrogen, for example, back to the reservoir 120. Under certain operating conditions the closed circulatory mode is desirable and sometimes necessary if, for example, liquid nitrogen should commence to discharge from the above surface vent valve 144. In the closed circulatory mode the valve 46 is, of course, maintained in the open position and the pump 128 is used to pump liquid nitrogen into the interior chamber formed between the housing 16 and the transmission line 10. During all operating conditions the operation of the pump 128 and the compressor 132 are monitored to maintain a predetermined pressure within the interior of the housing 16 so that said pressure does not significantly exceed the existing hydrostatic sea water pressure at the location of the housing. The compressor 132 and pump 128 could be automatically controlled by interlocking their driving motors directly with a suitable pressure monitoring and control device, not shown. The aforementioned pressure monitoring device could also be adapted to open the valve 144 in the event that pressure in the interior of the housing 16 exceeded a predetermined amount with the pump and compressor in a minimum output mode or shutdown.

After a suitable freezing time has elapsed in accordance with the teachings of the aforementioned patents the plug is tested by, for example, pressurizing one side thereof within the transmission line and observing the line internal pressure on the other side. If no leakage is occurring the line is ready for the repair or modification work for which the plug was installed.

Upon completion of the operation for which the temporary plug was formed the compressor 132 and/or pump 128 would be shut down and the valve 146 closed while valve 144 is open to vent nitrogen gas from the chamber formed within the housing 16. The housing 16 can then be removed in a conventional manner by sensing skilled divers down to disconnect the connector assemblies 40 and 54 followed by the removal of the housing 16 from the pipeline 10. It might be necessary to pressurize the interior of the housing 16 or flood the same with sea water to equalize the pressure forces acting thereon to facilitate removal of the housing from the pipeline. In this regard the check valve 64 could be of the type which could be remotely operated to be held open so that also upon opening of the valves 62, 48 and 144 the chambers 21–23 could be flooded.

Depending on the size of the pipeline or other conduit and the length of time for which the plug must be formed and maintained it might be desirable to provide for lowering the source of liquid nitrogen to the seafloor to minimize the length of supply and return conduits with respect to the reservoir 120. This would minimize the length of the conduit assembly 73 and also minimize the heat absorbed by the liquid nitrogen while it is being pumped to the interior of the housing 16. To this end the reservoir 120 could be adapted to be fitted with ballast tanks which could be filled with water to submerge the reservoir 120 for placement close to the work station at which the housing 16 was located on the pipeline 10. When the reservoir 120 was required to be raised to the surface the aforementioned ballast tanks would be connected to a source of compressed air, not shown, mounted on the service vessel 98, for example, whereby water within the ballast tanks could be evacuated to raise the reservoir 120 to the surface for hoisting aboard the vessel 98.

Figure 2:
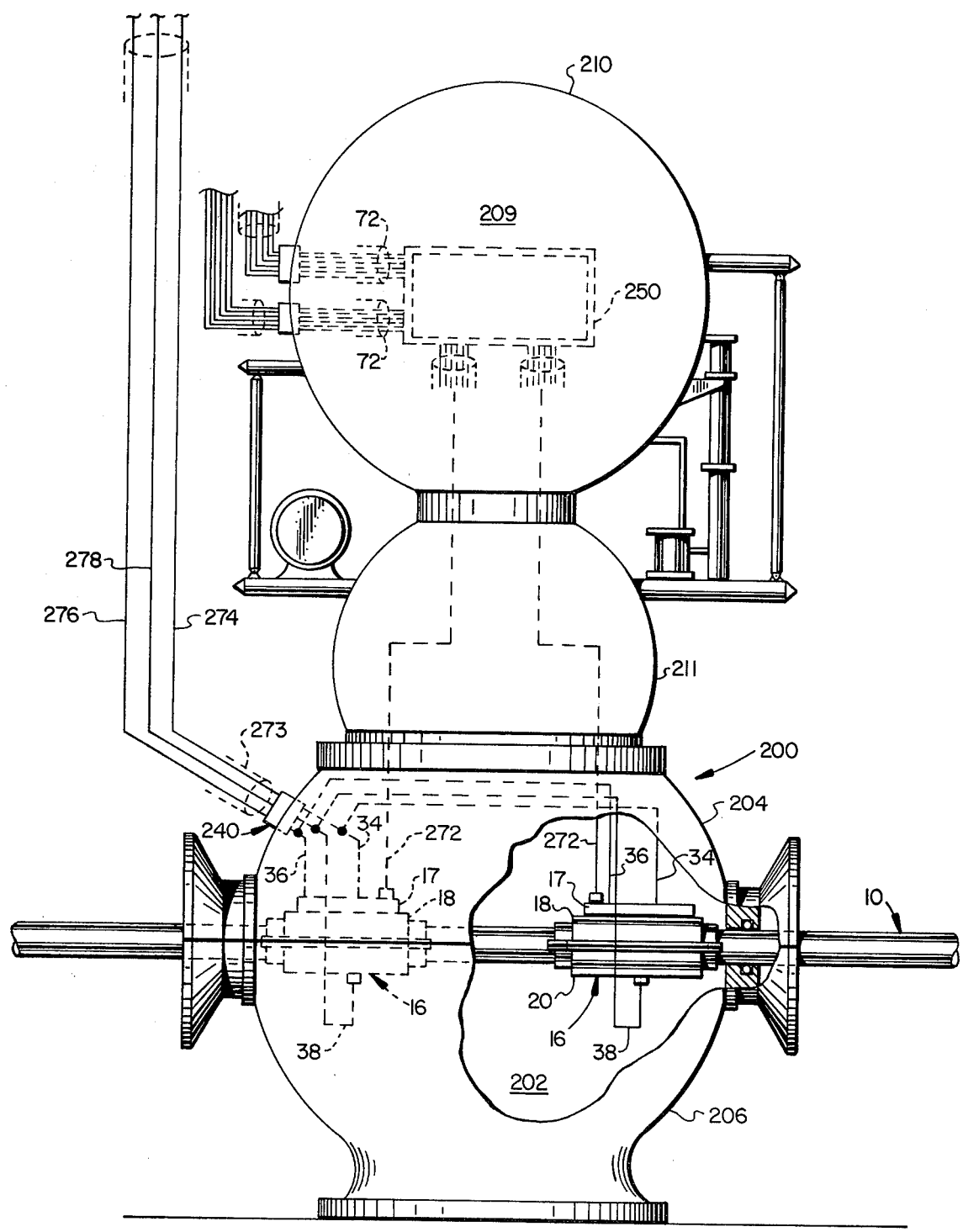
FIG. 2 is a schematic illustration of an alternate embodiment of the present invention wherein the apparatus is disposed within a submarine habitat.

When transmission line repair or modification work is to be carried out at depths greater than approximately 100 feet or under temperature or other environmental conditions which would not permit prolonged diver exposure it is contemplated that the present invention could be carried out using an underwater habitat including a hyperbaric chamber. Referring now to FIG. 2 of the drawings there is illustrated in somewhat schematic form a submarine habitat generally designated by the numeral 200. The habitat 200 includes a work chamber 202 formed by opposed and somewhat hemispherical shell members 204 and 206 which are shown in assembled relationship and sealingly engaged with spaced apart portions of the pipeline 10. The habitat 200 may be of a known type wherein the members 204 and 206 are lowered into position and placed around the pipeline 10. The chamber 202 is then purged of sea water and maintained at a suitable pressure to allow workmen to enter the chamber from a control station and habitat condition monitoring chamber 209 formed within the habitat section 210. Access to the interior of the section 210 would normally be gained through an airlock chamber, not shown, formed as part of the habitat and adapted to be connected to a submersible vessel, also not shown, for carrying operating personnel to and from the habitat 200.

As shown in FIG. 2 the habitat 200 may be large enough to provide an interior work chamber 202 suitable for the placement of two housings 16 spaced apart one from the other. In the arrangement in accordance with the embodiment of FIG. 2 the control valves for controlling the flow of cryogenic fluid to and from the housings 16 could be grouped within an enclosure 17 mounted on, for example, the housing section 18. In the arrangement of the embodiment of FIG. 2 the use of a purging valve for purging water from the interior chamber of the housings 16 after placement on the pipeline 10 would not be required since the chamber 202 would be evacuated of sea water before the housings 16 were placed on the transmission line. However, in order to minimize the risk of displacing breathing air within the chamber 202 it is preferred that the conduits conducting liquid or gaseous cryogenic fluid, such as nitrogen, to and from the housings 16 be closed and connected to the source of liquid nitrogen at the surface by way of the conduit assembly 273 and a self closing quick disconnect connector assembly 240 similar to the connector assembly 40 illustrated in FIG. 1. Accordingly, the nitrogen vent lines and purge lines would be routed out of the chamber 202 to minimize the discharge of gaseous nitrogen within the chamber. Control of the valves 46, 48 and 50 as well as monitoring of the pressures and temperatures within the chambers 16 could be carried out from a monitoring and operating console 250 disposed within the interior of the habitat section 210, as illustrated schematically in FIG. 2. Accordingly, conductor assemblies 272 would be connected to the housing enclosures 17, as indicated in FIG. 2, for providing the control and monitoring signal conductors to the operating console 250. If it were desired to provide a backup control console on the service vessel 98, for example, conductor assemblies 72 could be provided for transferring the control and monitoring signals from a console on the vessel to the respective housings 16 by way of the console 250 as indicated in FIG. 2. Conduits 274, 276 and 278 within the conduit assembly 273 would also be of sufficient size to provide for circulation of cryogenic fluid to both of the housings 16 which would have their respective conduits 34, 36 and 38 connected as shown schematically in FIG. 2. Accordingly, with the conduit hookup as shown in FIG. 2, control of circulation of fluid through each of the housings 16 would be carried out through opening and closing of the respective valves 46, 48 and 50 associated with each of the housings. Alternatively, separate conduit assemblies such as the conduit assemblies 273 could be provided and coupled to respective ones of the housing 16 to provide the circuitry illustrated in FIG. 1, except, for the deletion of the conduit 60 and the purge valve 62.

In the installation and operation of the housings 16 to form spaced apart temporary plugs in the pipeline 10 in accordance with the arrangement illustrated in FIG. 2, the housings would be premounted inside the section 240, for example, of the habitat 200 before lowering of the habitat into the water for placement around the transmission line 10. Once the habitat was in place and assembled, compressed air would then be injected into the habitat at a pressure slightly higher than the hydrostatic sea water pressure at the depth of the habitat to remove all water from within the chamber 202. The habitat section 210 would, of course, be sealed from the sea water at all times preferably at a hatch closure formed between the section 210 and intermediate section 211 as illustrated in FIG. 2.

Once the habitat has been mounted in place around the pipeline 10 and the water removed from the chamber 202 one or both of the housings 16 would be installed around the pipeline 10 and suitably sealed in accordance with the teachings of U.S. Pat. No. 4,220,012 to seal the interior chamber formed between the housing sections and the exterior of the transmission line. The conduits 34, 36 and 38 would then be connected to the conduit assembly 273 by way of the bulkhead connector assembly 240 so that cryogenic fluid such as liquid nitrogen could be circulated through the chambers formed by the respective housings under control and monitoring from the operating console 250 or a similar console mounted on the service vessel 98, not shown in FIG. 2. Those skilled in the art will appreciate that the equipment required for circulation of the cryogenic fluid to the chambers formed by the housings 16 and as shown being mounted within the enclosure 150 in FIG. 1 could, conceivably, be mounted within a suitable habitat such as the habitat 200 whereby the complete system required for forming a temporary plug or plugs in a pipeline 10 could be operated from a submarine location. As mentioned previously, the reservoir 120 could be separately mounted in conjunction with suitable ballast tanks which could be operated to carry the reservoir to and from the water surface whereby the reservoir 120 would be in effect a self contained and/or remotely controlled submarine tank vessel.

Figure 5:
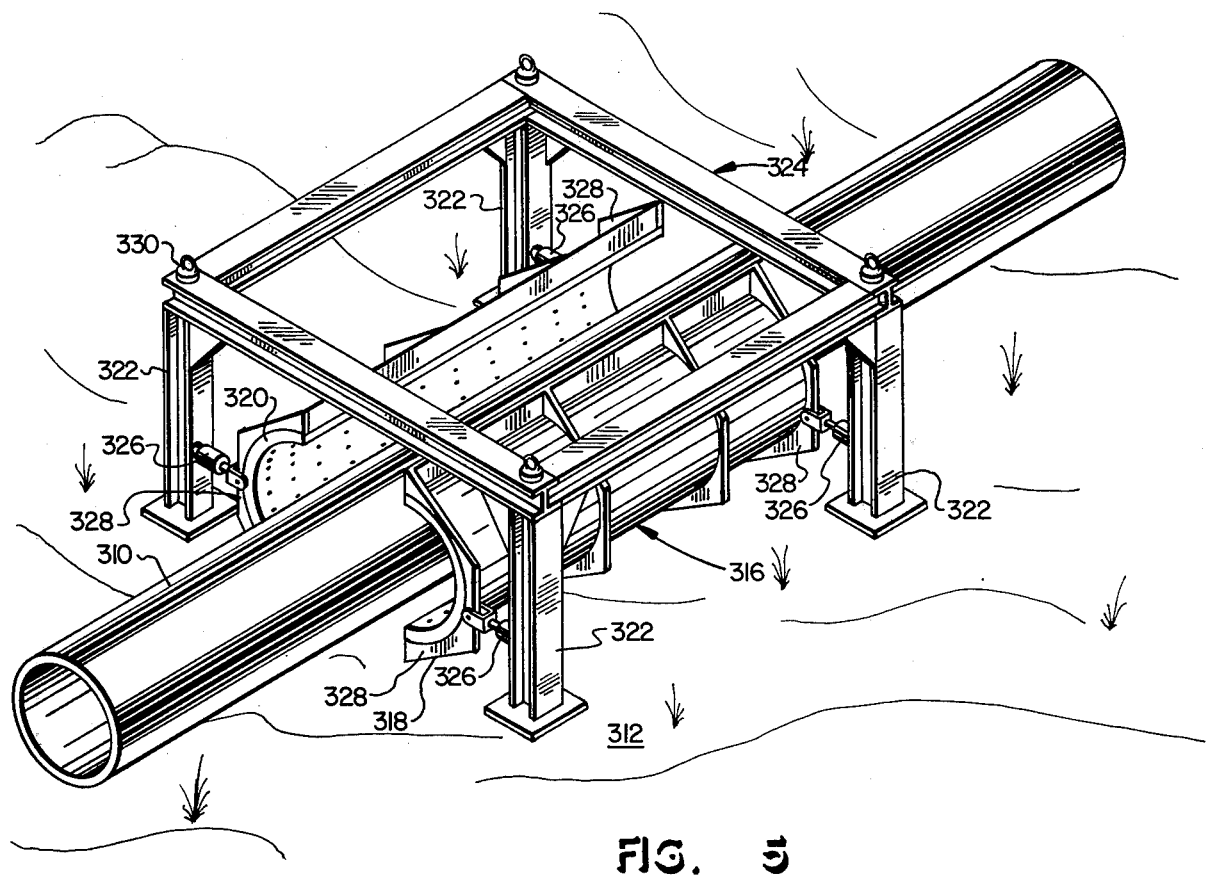
FIG. 5 is a perspective view of a first alternate embodiment of a cryogenic fluid circulating housing.

The present invention also contemplates certain improvements in the housing which is disposed around the transmission line for circulating the cryogenic fluid. In certain applications in accordance with the method and apparatus of the present invention, the size of the transmission line or other conduit to be repaired or serviced is sufficiently large as to require special arrangements of the fluid circulating housing. Referring to FIG. 5, for example, there is illustrated a section of a relatively large diameter conduit or transmission line 310 disposed on a seafloor 312. The size of the transmission line 310 is such that it would be particularly difficult for divers to handle the respective cylindrical half sections of the fluid circulating housing. Accordingly, an improved arrangement of a housing for circulating cryogenic fluid around the exterior of a portion of the transmission line 310 is illustrated in FIG. 5 and generally designated by the numeral 316. The housing 316 is made up of two opposed and generally cylindrical half sections 318 and 320 which are respectively mounted opposite each other on spaced apart upstanding legs 322 of a support frame 324. As illustrated in FIG. 5, the housing section 318 is connected at its opposite ends to two of the spaced apart support legs 322 by respective hydraulic cylinder actuators 326 suitably connected to housing flange portions 328. The housing section 320 is similarly mounted on the other pair of frame support legs 322. The complete assembly of the housing 316 and the frame 324 is adapted to be lowered by a cable arrangement, not shown, connected to suitable brackets 330 mounted on opposite upper corners of the frame 324.

In utilizing the housing 316 to carry out the method of forming a temporary plug in the transmission line 310, the frame 324 would be lowered from the service vessel 98, for example, by a cable and hoist arrangement and would be guided by submarine divers into position around the transmission 310. Suitable hydraulic lines, not shown, would be lowered to the frame 324 after placing the housing 316 in position and connected to a manifold and control valve assembly, also not shown, for actuation of the cylinders 326 to move the opposed housing sections 318 and 320 toward each other and to forcibly engage each other in sealing engagement with the transmission line 310. Alternatively, the hydraulic lines could already be attached to the frame 324 before it was lowered into the water. The housing 316 is also adapted to be provided with suitable connectors for connecting the conduit assembly 73 to the housing for circulation of cryogenic fluid through the interior of the housing. The interior construction of the housing 316 is preferably similar to the housing 16 or the housings disclosed in U.S. Pat. No. 4,220,012.

Figure 6:
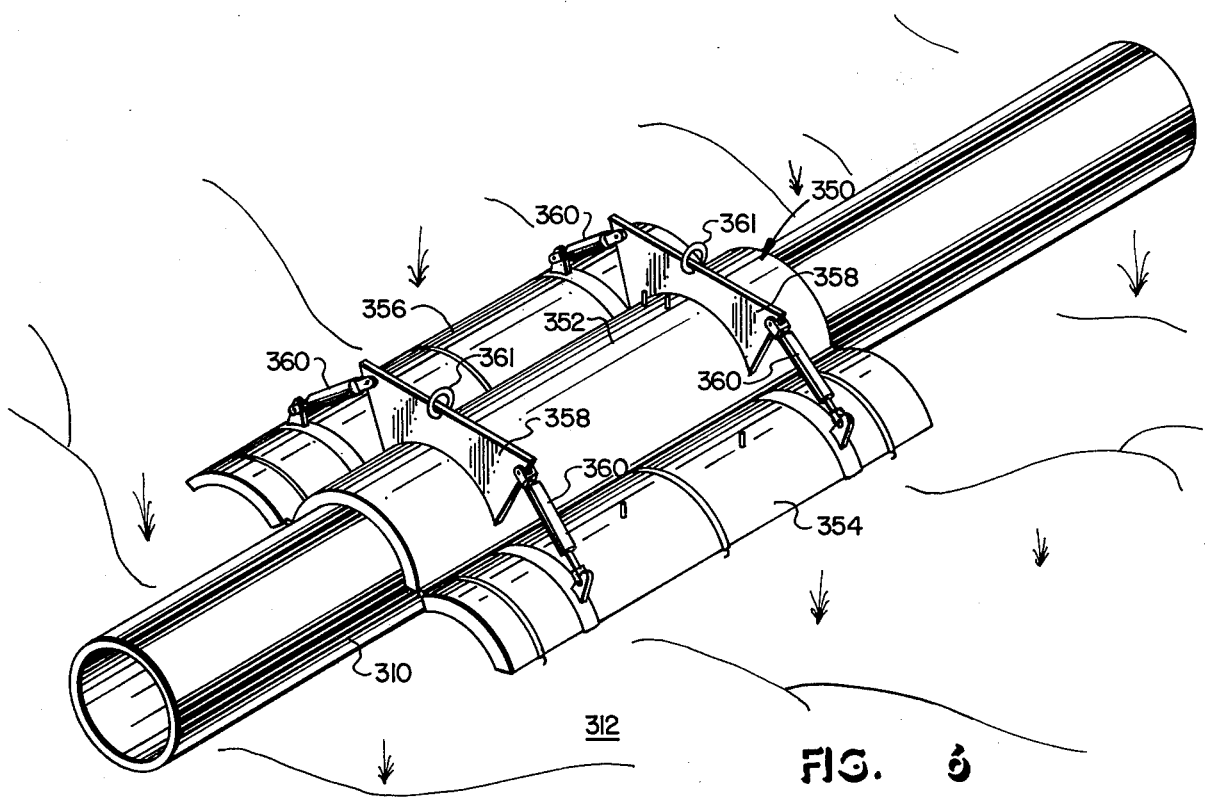
FIG. 6 is a perspective view of a second alternate embodiment of a cryogenic fluid circulating housing.

A second alternate embodiment of a housing for circulating cryogenic fluid around a relatively large diameter transmission line is illustrated in FIG. 6. Referring to FIG. 6, the section of the transmission line 310 is illustrated with a cryogenic fluid circulating housing disposed thereon and generally designated by the numeral 350. The housing 350 is made in three cylindrical segment shaped sections designated by the numerals 352, 353 and 356, respectfully. The housing sections 352, 354 and 356 are interconnected along their adjacent longitudinal edges by suitable hinge means to provide a somewhat clam shell arrangement. The housing section 352 includes spaced apart bracket portions 350 which are adapted to support the ends of four hydraulic cylinder actuators 360, as illustrated. The opposite ends of the actuators 360 are connected to respective ones of the housing sections 354 and 356, as illustrated. The bracket portions 358 are also provided with cable hooks 361 for manipulating the housing by a cable hoist, not shown, which would be disposed on the service vessel 98.

As with the housing shown in FIG. 5, the housing 350 would be lowered and maneuvered for placement on the transmission line 310, as shown, with the housing sections 354 and 356 in the open position. Upon placement of the housing section 350 on the line 310, suitable hydraulic lines would be connected to a manifold and control valve assembly, not shown, for actuation of the cylinders 360 to close the housing sections 354 and 356 around the surface of the transmission line 310. The longitudinal edges of the housing sections 354 and 356 opposite the edges which are hinged to the section 352 may be provided with suitable latch means for latching the housing sections 354 and 356 to each other to assure that a fluid tight seal would be formed along the respective edges. After placement of the housing assembly 350 on the transmission line, the conduit assemblies 72 and 73 would be connected to respective conduits arranged on the housing in a manner similar to the arrangement illustrated for the housing 16 in FIG. 1.

Those skilled in the art will also appreciate that the method and apparatus of the present invention for forming temporary plugs in fluid transmission lines and the like in a submarine environment may take various forms and be subjected to various modifications without departing from the scope and spirit of the invention as defined in the appended claims.

What is claimed is:

1. A method for forming a temporary plug in a submarine fluid pipeline or the like comprising the steps of:
   providing a quantity of freezable liquid at a predetermined location within said pipeline;
   providing a generally cylindrical housing having an interior portion forming an annular chamber between the exterior surface of said pipeline and said housing when said housing is placed on said pipeline, said housing being longitudinally divided into at least two sections and having means thereon for conducting fluid to and from said chamber, said means including a plurality of conduits and respective remotely operable valves connected to respective ones of said conduits;
   providing a pressure sensing element disposed on said housing for measuring the fluid pressure within said chamber;
   installing said housing around the exterior of said pipeline at said predetermined location on said pipeline;
   connecting at least one of said conduits to a source of low temperature fluid;
   remotely controlling said valves to conduct low temperature fluid to said chamber to freeze said quantity of liquid to form said plug; and
   controlling the fluid pressure within said chamber in accordance with the pressure of the environment around the exterior of said housing.

2. A method for forming a temporary plug in a submarine fluid pipeline or the like comprising the steps of:
   providing a quantity of freezable liquid at a predetermined location within said pipeline;
   providing a hyperbaric habitat having fluid conduit connector means thereon for connecting conduits exterior of said habitat to conduits within said habitat;
   providing a generally cylindrical housing having an interior portion forming an annular chamber between the exterior surface of said pipeline and said housing when said housing is placed on said pipeline, said housing being longitudinally divided into at least two sections and having means thereon for conducting fluid to and from said chamber, said means including a first set of conduits and respective remotely operable valves connected to respective ones of said conduits of said first set;
   installing said habitat around said pipeline at said predetermined location and purging water from the interior of said habitat;
   installing said housing around the exterior of said pipeline and within said habitat at said predetermined location;
   connecting said first set of conduits to said connector means;
   providing a second set of conduits and connecting said second set to said connector means on the exterior of said habitat, connecting one of said conduits of said second set to a source of low temperature fluid;
   remotely controlling said valves to conduct low temperature fluid to said chamber to freeze said quantity of liquid to form said plug; and
   venting fluid vapor from said chamber to the atmosphere above the water surface.

3. A method for forming a temporary plug in a submarine fluid pipeline or the like comprising the steps of:
   providing a quantity of freezable liquid at a predetermined location within said pipeline, at which location said pipeline is exposed directly to sea water;
   providing a generally cylindrical housing having an interior portion forming an annular chamber between the exterior surface of said pipeline and said housing when said housing is placed on said pipeline, said housing being longitudinally divided into at least two sections and having means thereon for conducting fluid to and from said chamber, said means including a plurality of conduits and respective remotely operable valves connected to respective ones of said conduits;
   providing a plurality of elongated flexible conduits including connector means at opposite ends thereof;
   providing signal conducting means for said valves for controlling said valves to open and close;
   carrying said housing from the water surface to said predetermined location in at least two sections;
   installing said housing around the exterior of said pipeline at said predetermined location and in sealing relationship to said pipeline to form said chamber;
   connecting said flexible conduits at one end to respective ones of said remotely operable valves;
   connecting at least one of said flexible conduits at said opposite end thereof to said source of low temperature fluid;
   operating first and second ones of said valves to open;
   supplying pressure gas to said chamber through said first valve to purge water from said chamber;
   closing said second valve to prevent reentry of water into said chamber; and
   remotely controlling said valves to conduct low temperature fluid to said chamber to freeze said quantity of liquid to form said plug.

4. The method set forth in claim 3 together with the step of:
   supplying pressure gas to purge said chamber from said source of low temperature fluid by vaporizing said fluid and pumping said fluid vapor to said chamber.

5. The method set forth in claim 3 together with the steps of:
   connecting second and third ones of said flexible conduits to third and fourth valves in communication with said chamber; and
   connecting the opposite end of one of said second and third conduits with said source of low temperature fluid and with a vent line, said vent line having an outlet above the water surface.

6. The method set forth in claim 5 together with the steps of:
   opening said one of said third and fourth valves and said vent line; and
   conducting low temperature fluid to said chamber and venting fluid vapor from said chamber to the atmosphere above the water surface through said vent line.

7. The method set forth in claim 6 together with the steps of:
   opening the other of said third and fourth valves and closing said one valve and said vent line; and
   conducting low temperature fluid in a liquid state from said source to said chamber and returning said liquid to said source.

8. The method set forth in claim 5 wherein:
   said method includes controlling the flow of low temperature fluid through said chamber to maintain the fluid pressure in said chamber at a predetermined value in relation to the water pressure in the vicinity of said housing.

9. The method set forth in claim 3 wherein:
   said method includes providing a first surface vessel including means for connecting said conduits to said source of low temperature fluid, said means including further conduits and connector means;
   providing a second surface vessel including said source of low temperature fluid on board; and
   anchoring said first surface vessel and connecting said flexible conduits to said source of low temperature fluid through said connector means on said first surface vessel and said further conduit means.

10. The method set forth in claim 3 together with the step of:
    monitoring the temperature on the surface of said pipeline within said chamber during the supplying of low temperature fluid to said chamber.

11. The method set forth in claim 1 or 9 together with the steps of:
    providing pump means and compressor means connected in parallel to said source of low temperature fluid; and
    controlling said pump means or said compressor means to supply low temperature fluid to said chamber at a predetermined pressure.

12. In an apparatus for forming a temporary plug in a submarine fluid transmission line by freezing a quantity of liquid at a predetermined location within said transmission line;
    a housing comprising at least two housing sections formed in such a way as to provide for removably mounting said housing around the exterior of said transmission line at said predetermined location to form a chamber around the exterior of said transmission line, first and second fluid conduits in communication with said chamber in said housing, first and second power operated valves connected to said first and second conduits, respectively, for controlling the flow of fluid through said conduits and said chamber, first connector means for releasably connecting said conduits to a source of low temperature fluid, said source comprising a reservoir, and a pump connected to said reservoir for conducting fluid to said chamber by way of said conduit, said housing including a third conduit in communication with said chamber and a third valve in said conduit for conducting water out of said chamber to purge said chamber after installation of said housing around said transmission line;
    an elongated conduit assembly including at least two separate supply and return conduits and second connector means for releasably connecting said reservoir to said chamber by way of said conduit assembly and said first and second connector means for circulating low temperature fluid through said chamber to freeze said liquid to form said plug; and
    means for supplying pressure gas through one of said first and second conduits to purge water out of said chamber by way of said third valve and said third conduit.

13. The apparatus set forth in claim 12 wherein:
    said third valve is normally closed and is power operated to be in an open position when said pressure gas is being conducted to said chamber.

14. The apparatus set forth in claim 12 wherein:
    said pressure gas is supplied from said source of low temperature fluid, said apparatus including a pressure gas supply circuit in communication with said reservoir, said circuit including a heat exchanger for heating said low temperature fluid to convert said fluid to a gaseous state, a compressor in said circuit for compressing said gas, and valve means for switching said compressor into communication with one of said first and second conduits for conducting pressure gas to said chamber.

15. The apparatus set forth in claim 14 wherein:
    said reservoir, said pump and said compressor are disposed on board a floating vessel and are interconnected to said conduit assembly by releasable connector means at a buoy anchored generally above said predetermined location on said transmission line.

16. The apparatus set forth in claim 15 together with:
    signal conductor means comprising signal conductors connected to said valves for operating said valves, an elongated signal conductor assembly including releasable connector means for connecting respective signal conductors leading to said valves to a control station on said vessel through a releasable connector assembly on said buoy.

17. The apparatus set forth in claim 12 wherein:
    said housing includes a fourth conduit in communication with said chamber and a vent conduit interconnected between said fourth conduit and a vent, a fourth valve interposed in said fourth conduit, said fourth valve being power operated to be opened to vent fluid vapor from said chamber when said low temperature fluid is being supplied to said chamber.

18. The apparatus set forth in claim 17 wherein:

said vent includes a conduit in said conduit assembly for conducting fluid vapor to the surface of a body of water in which said transmission line and said housing are submerged.

19. The apparatus set forth in claim 17 wherein:

said housing includes a pair of opposed semi-cylindrical shells removably connectable to each other to form said chamber around said transmission line, manifold means in each of said shells for distributing fluid to said chamber, said first and second conduits opening directly into said manifold, said fourth conduit opening directly into said chamber, and said third conduit opening into said chamber and said manifold.

20. The apparatus set forth in claim 19 wherein:

said housing includes means for sensing the fluid pressure within said chamber.

21. The apparatus set forth in claim 17 wherein:

said first, second and fourth conduits are disposed in said conduit assembly, said conduit assembly including releasable connectors at opposite ends thereof for connecting said housing to said source of low temperature fluid and said vent, respectively.

22. In an apparatus for forming a temporary plug in a submarine fluid transmission line by freezing a quantity of liquid at a predetermined location within said transmission line;

a housing comprising at least two housing sections formed in such a way as to provide for removably mounting said housing around the exterior of said transmission line at said predetermined location to form a chamber around the exterior of said transmission line, first and second fluid conduits in communication with said chamber in said housing, first and second power operated valves connected to said first and second conduits, respectively, for controlling the flow of fluid through said conduits and said chamber, first connector means for releasably connecting said conduits to a source of low temperature fluid, said source comprising a reservoir, and a pump connected to said reservoir for conducting fluid to said chamber by way of said conduits;

an elongated conduit assembly including at least two separate supply and return conduits and second connector means for releasably connecting said reservoir to said chamber by way of said conduit assembly and said first and second connector means for circulating low temperature fluid through said chamber to freeze said liquid to form said plug; and means for supplying pressure gas from said source of low temperature fluid for purging water out of said chamber including a pressure gas supply circuit in communication with said reservoir, said circuit including a heat exchanger for heating said low temperature fluid to convert said fluid to a gaseous state, a compressor in said circuit for compressing said gas, and valve means for switching said compressor into communication with one of said first and second conduits for conducting pressure gas to said chamber.

23. The apparatus set forth in claim 22 wherein:

said reservoir, said pump and said compressor are disposed on board a floating vessel and are interconnected to said conduit assembly by releasable connector means at a buoy anchored generally above said predetermined location.

24. The apparatus set forth in claim 23 together with:

signal conductor means comprising signal conductors connected to said valves for operating said valves, and an elongated signal conductor assembly including releasable connector means for connecting respective signal conductors leading to said valves to a control station on said vessel through a releasable connector assembly on said buoy.

* * * * *